United States Patent
Chang (10) Patent No.: US 6,340,039 B1
(45) Date of Patent: Jan. 22, 2002

(54) STRUCTURE OF A WOOD CARVING MACHINE

(76) Inventor: Wen-Chi Chang, PO Box 82-144, Taipei (TW)

( * ) Notice: Subject to any disclaimer, the term of this patent is extended or adjusted under 35 U.S.C. 154(b) by 0 days.

(21) Appl. No.: 09/620,127

(22) Filed: Jul. 20, 2000

(51) Int. Cl.[7] .............................. B27B 31/00; B25H 1/00
(52) U.S. Cl. ................. 144/253.2; 144/135.2; 144/286.5; 269/55; 269/249; 269/279; 269/289 R; 269/292
(58) Field of Search .............................. 83/468.2, 468.7, 83/477.2, 466; 144/1.1, 135.2, 253.1, 253.2, 253.5, 286.1, 286.5; 269/55, 56, 73, 249, 279, 291, 292, 289 R (56) References Cited

U.S. PATENT DOCUMENTS

| | | | | |
|---|---|---|---|---|
| 2,076,511 A | * | 4/1937 | Hedgpeth | 144/135.2 |
| 2,799,305 A | * | 6/1957 | Groehn | 144/135.2 |
| 5,042,542 A | * | 8/1991 | Purviance | 144/253.2 |
| 5,205,198 A | * | 4/1993 | Foray et al. | 269/55 X |
| 5,452,752 A | * | 9/1995 | Aigner | 144/253.2 |

* cited by examiner

*Primary Examiner*—W. Donald Bray
(74) *Attorney, Agent, or Firm*—A & J (57) ABSTRACT

An improvement in the structure of a worktable for a wood carving machine includes a positioning device provided with a sleeve having a U-shaped recess at the top for mounting a supporting arm of a clamping device, the supporting arm being provided with an eccentric roller close to an intermediate portion thereof and adapted for sliding on the upper edge of the positioning device, and the clamping device being replaceable with a holder which can be moved up and down along a rod and rotated with respect to a cross-shaped sleeve for holding a workpiece in place.

1 Claim, 10 Drawing Sheets

PRIOR ART

FIG. 1

PRIOR ART

STRUCTURE OF A WOOD CARVING MACHINE

BACKGROUND OF THE INVENTION

1. Field of the Invention

This invention is related to an improvement in the structure of a worktable for a wood carving machine and in particular to one having a positioning device and a clamping device on the worktable which can facilitate the positioning of a workpiece.

2. Description of the Prior Art

Figure 1:
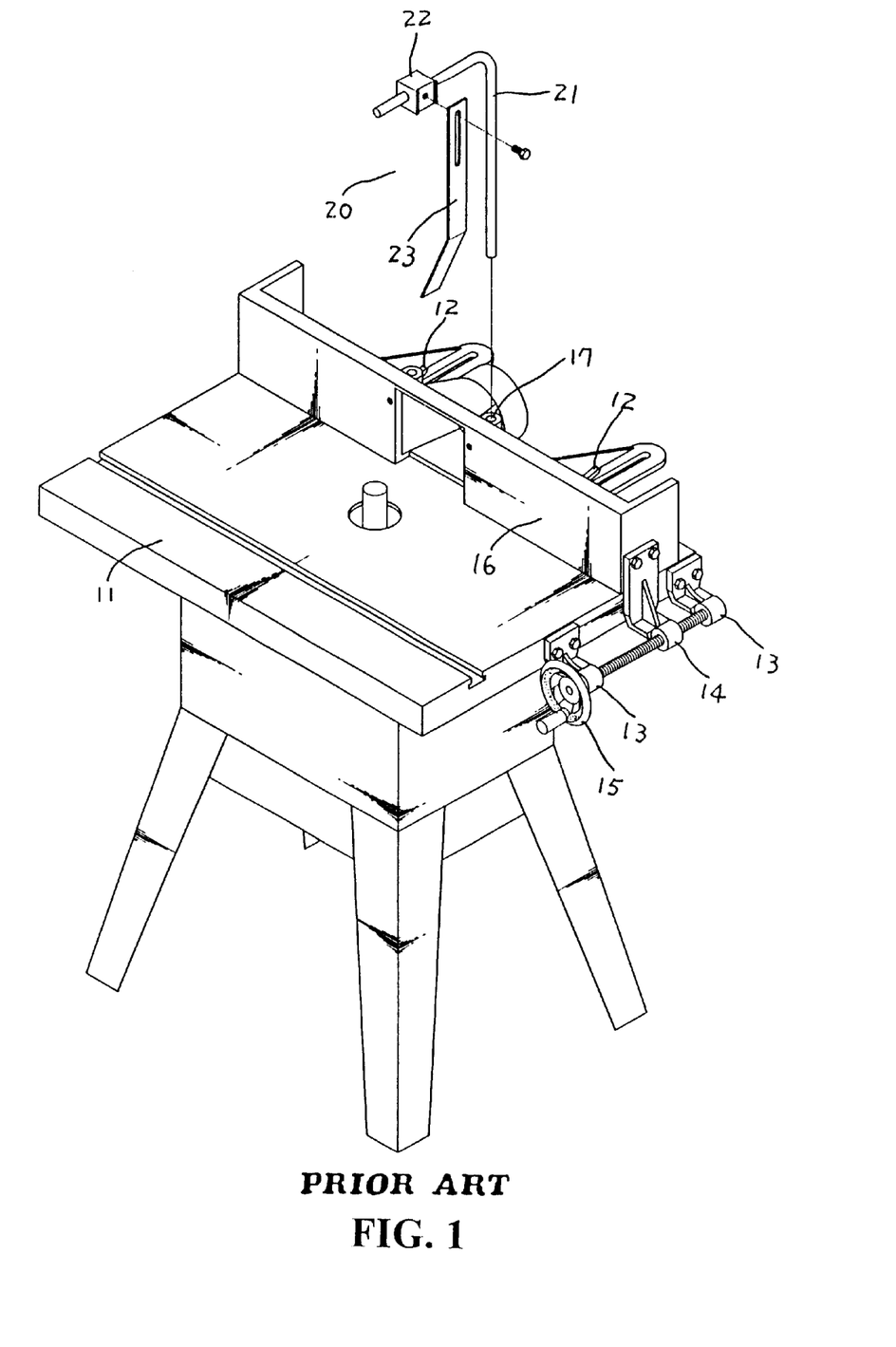
FIG. 1 is an exploded view of a prior art worktable for a wood carving machine.
Figure 2:
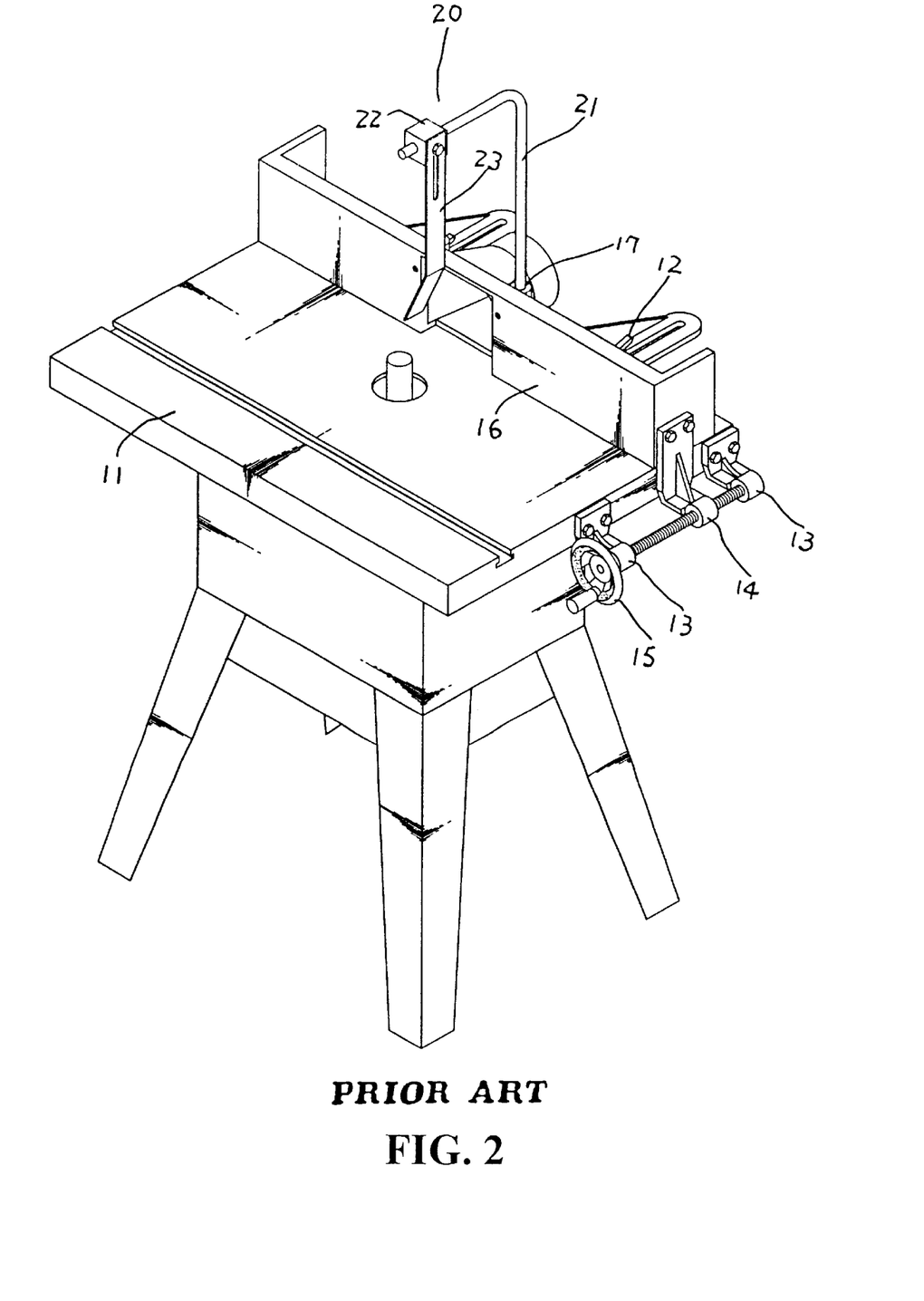
FIG. 2 is a perspective view of the prior art worktable for a wood carving machine.

As shown in FIGS. 1 and 2, the conventional worktable 11 for a wood carving machine utilizes an adjust bolt 12, two stationary brackets 13, a movable bracket 14, an adjust screw rod 15 and a positioning device 16 to adjust the position of a workpiece. In addition, the positioning device 16 is formed with a hole 17 on which is mounted a holding device 20. The holding device 20 comprises an L-shaped rod 21, a rectangular block 22 and a spring leaf 23. The spring leaf 23 is disposed above the worktable 11 for holding a workpiece being processed. However, the positioning device 16 can only be moved to and fro and cannot be used for adjusting the carving angle and the inclination of the workpiece, thereby limiting the processing range and method and therefore causing much inconvenience in operation.

Therefore, it is an object of the present invention to provide an improvement in the structure of a worktable for a wood carving machine which can obviate and mitigate the above-mentioned drawbacks.

SUMMARY OF THE INVENTION

This invention is related to an improvement in the structure of a worktable for a wood carving machine and in particular to one having a positioning device and a clamping device on the worktable which can facilitate the positioning of a workpiece.

It is the primary object of the present invention to provide an improvement in the structure of a worktable for a wood carving machine which utilizes a U-shaped recess on the top of a sleeve to mount a clamping device for keeping a workpiece in place.

It is another object of the present invention to provide an improvement in the structure of a worktable for a wood carving machine which includes a clamping device having a supporting arm provided at the rear side with an eccentric roller adapted for sliding on an upper edge of a positioning device.

It is a further object of the present invention to provide an improvement in the structure of a worktable for a wood carving machine having a holder which can be moved up and down along a rod and rotated with respect to a cross-shaped sleeve for holding a workpiece in place.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 8 is another working view of the present invention;

DETAILED DESCRIPTION OF THE PREFERRED EMBODIMENT

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 3:
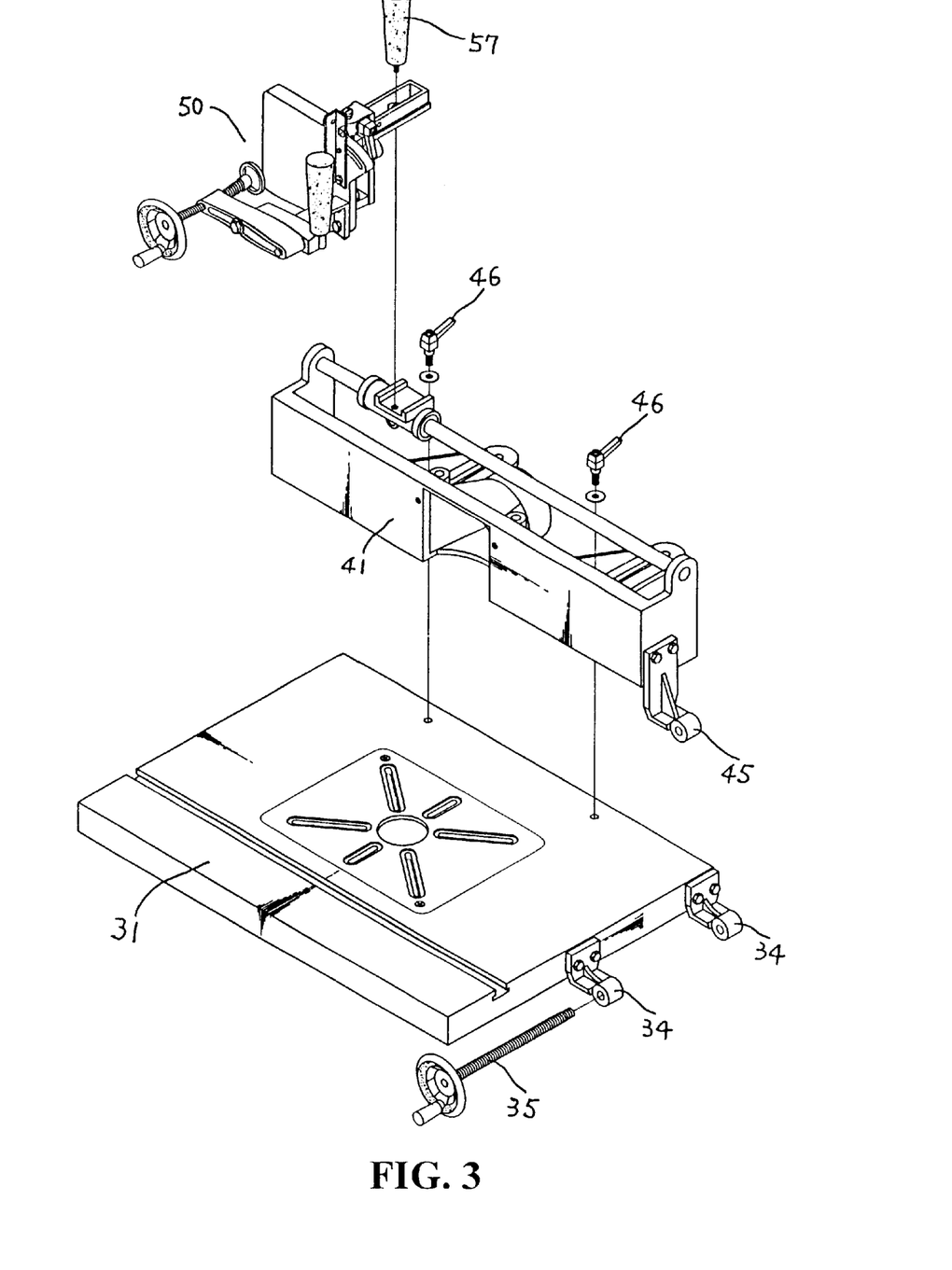
FIG. 3 is an exploded view of the present invention.
Figure 4:
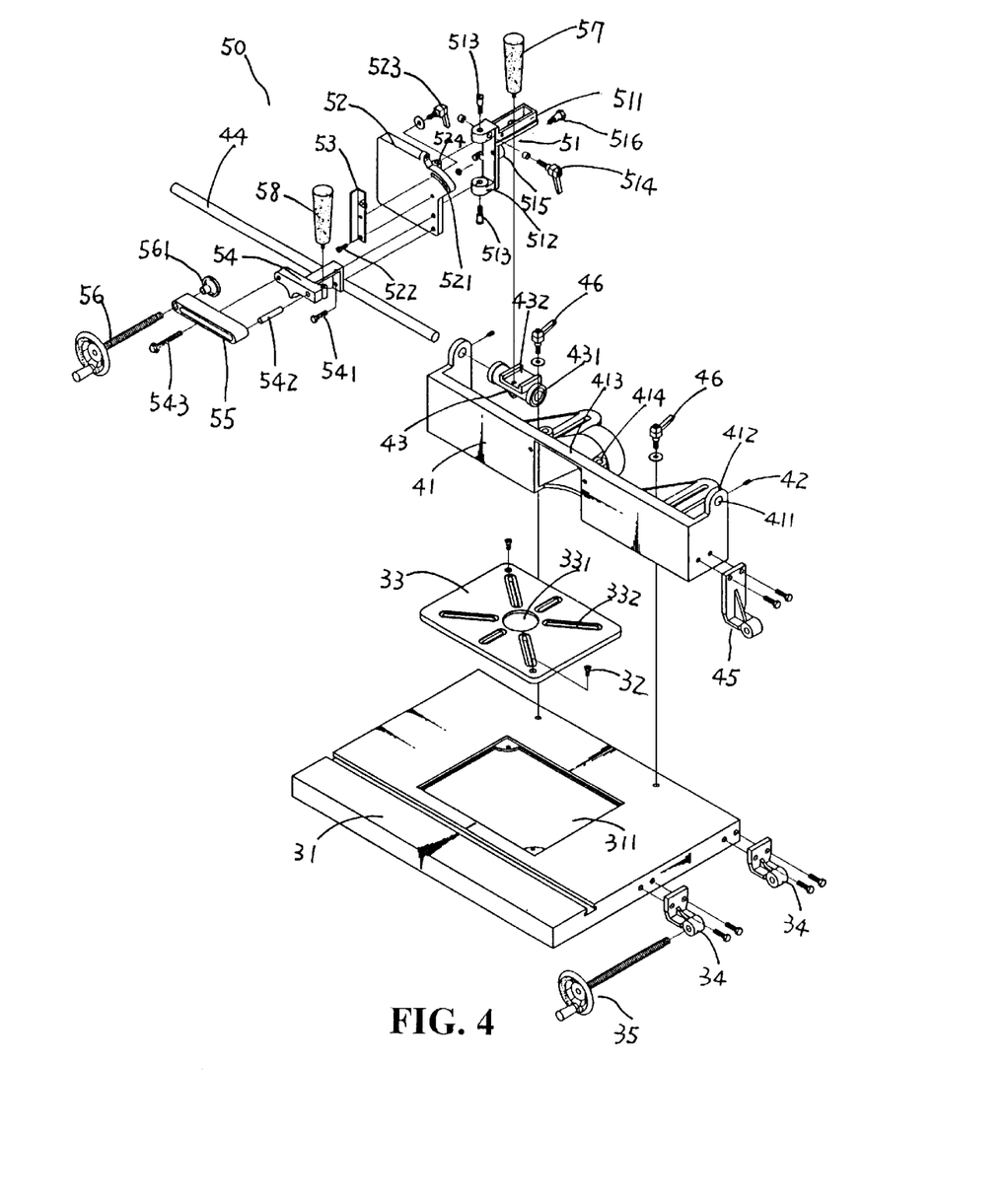
FIG. 4 is another exploded view of the present invention.

With reference to the drawings and in particular to FIGS. 3 and 4 thereof, the present invention utilizes two adjust bolts, two stationary brackets 34, a movable bracket 45, an adjust screw rod 35 on a platform 31 to connect with a positioning device 41 for holding a workpiece in place. A clamping device 50 is mounted on the front side of the positioning device 41 by a handle 57 for clamping a workpiece to be processed.

Figure 5:
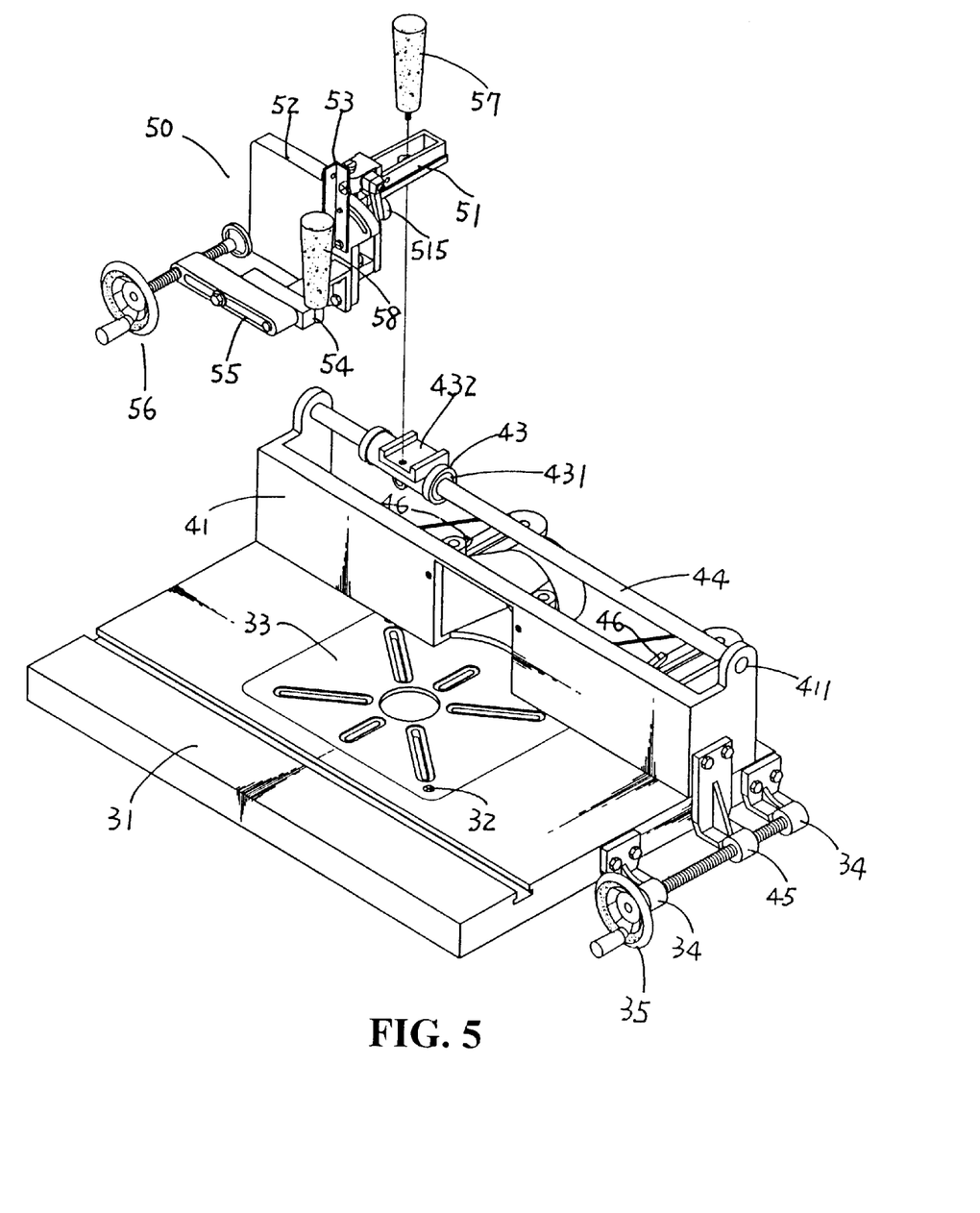
FIG. 5 is still another exploded view of the present invention.
Figure 6:
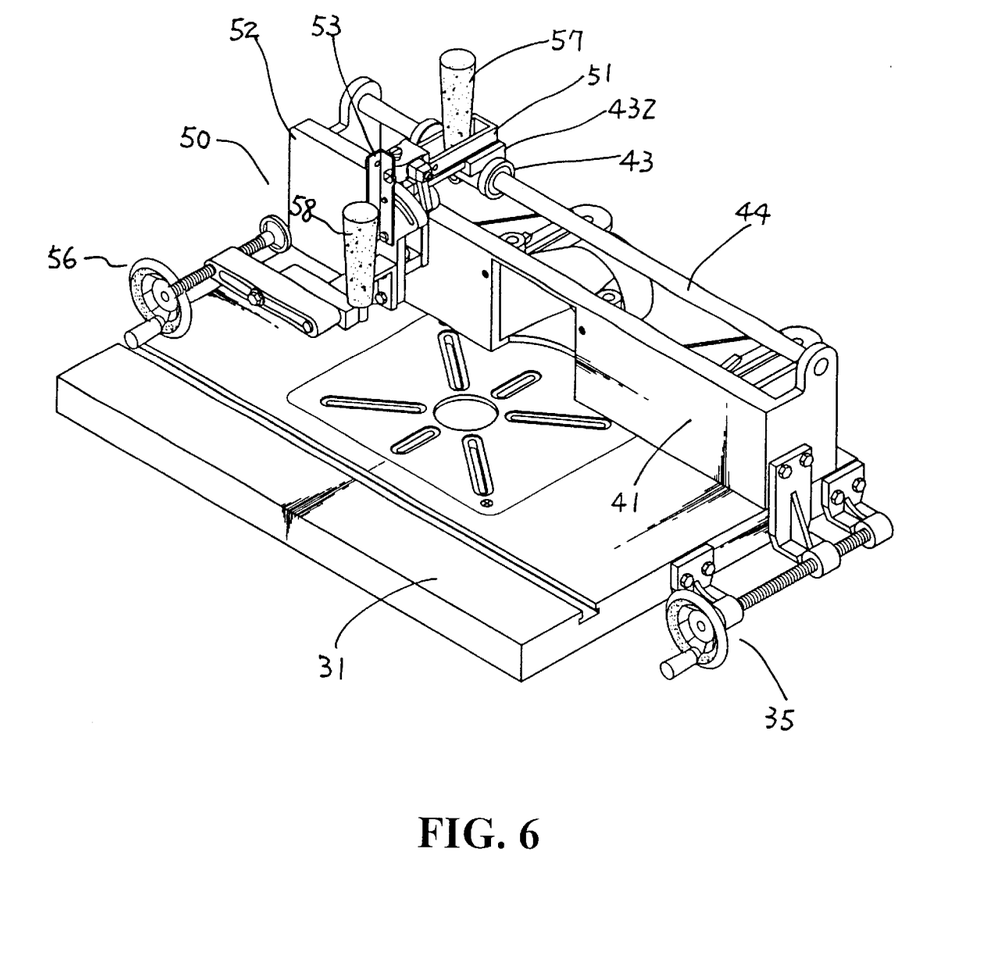
FIG. 6 is a perspective view of the present invention.

As shown in FIGS. 4, 5 and 6, the platform 31 is formed with a rectangular opening 311 in which is fitted a core plate 33 by screws 32. The core plate 33 has a center hole 331 and a plurality of radial slots 332. The two stationary brackets 34 are fixedly secured to one side of the platform 31 for engaging with the adjust screw rod 35.

The positioning device 41 has two upwardly extending lugs 412 at two sides thereof each having a hole 411. An axle 44, on which is fitted a sleeve 43, extends through the two holes 411 of the two lugs 412 and is kept in place by two countersunk screws 42 extending through the lugs 412 to bear thereagainst. The inside of the sleeve 43 is provided with a bearing 431 and the top of the sleeve 43 has a U-shaped recess 432 on which is mounted a supporting arm 51 of the clamping device 50 by the handle 57. The movable bracket 45 is fixedly secured to one side of the positioning device 41 and engaged with the adjust screw rod 35. The positioning device 41 is mounted on one side of top of the platform 31 by two adjust bolts 46.

The clamping device 50 comprises a supporting arm 51, a positioning plate 52, a baffle 53, a bracket 54, an adjust rod 55, an adjust screw rod 56 and two handles 57 and 58. The clamping device 50 is fixedly mounted on the U-shaped recess 432 of the sleeve 43 of the positioning device 41.

A seat 511 extends from the rear side of the supporting arm 51 and has an upper and lower lugs 512 between which is arranged the positioning plate 52 by bolts 513. An adjust screw 514 extends through the upper lug 512 to lock the positioning plate 52 in place. The rear side of the supporting arm 51 is provided with an eccentric roller 515 below the seat 511. The clamping device 50 is fixedly mounted on the U-shaped recess 432 of the sleeve 43 of the positioning device 41 so that the roller 515 is rotatably arranged on the upper edge 413 of the positioning device 41.

The positioning plate 52 is a generally rectangular in shape and having a curved groove 521 at one of its upper corners. An angular baffle 53 is mounted on the positioning plate 52 by an adjust bolt 523 and a bolt 522 so that the angular baffle 53 can be adjusted to rotate with respect to the bolt 522. The rear side of the positioning plate 52 has a lug 524 fitted between the two lugs 512 of the supporting arm 51 by bolts 513 thus enabling the positioning plate 52 to be rotated with respect to the bolts 513 when the adjust screw 514 is loosened to disengage with the positioning plate 52.

The angular baffle 53 is mounted on the front side of the positioning plate 52 and can be oscillated along the curved groove 521 of the positioning plate 52.

The bracket 54 is a generally T-shaped member having an end fixedly mounted on the front side of the positioning plate 52 by a screw 541. An adjust rod 55 is mounted on the bracket 54 by a pin 542 and a bolt 543. An adjust screw rod 56 extends through the slot of the adjust rod 55 to engage with a head 561 for holding a workpiece on the positioning plate 52.

Figure 7:
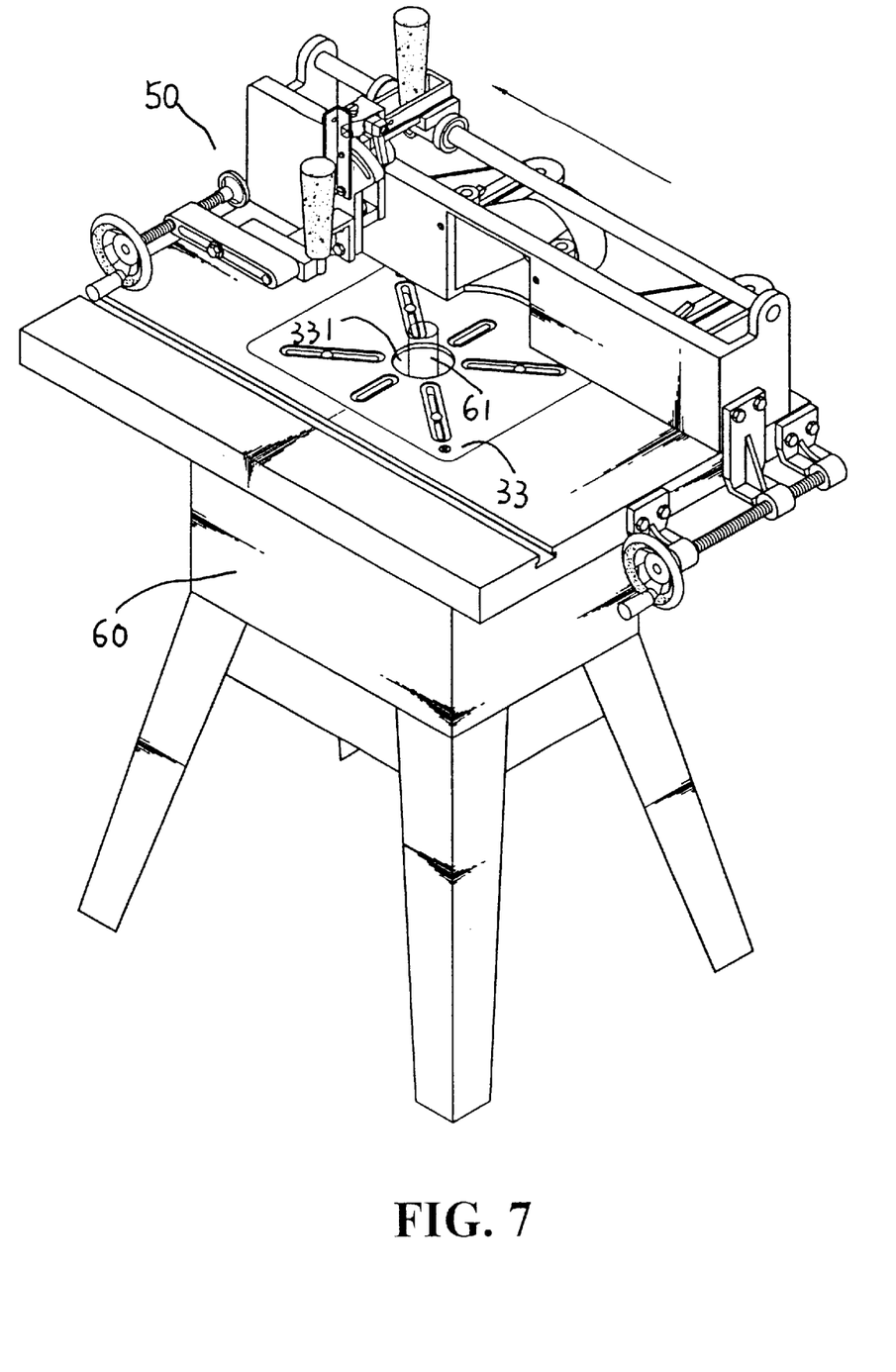
FIGS. 7 and 8 illustrate how to adjust the position of the clamping device according to the present invention.
Figure 8:
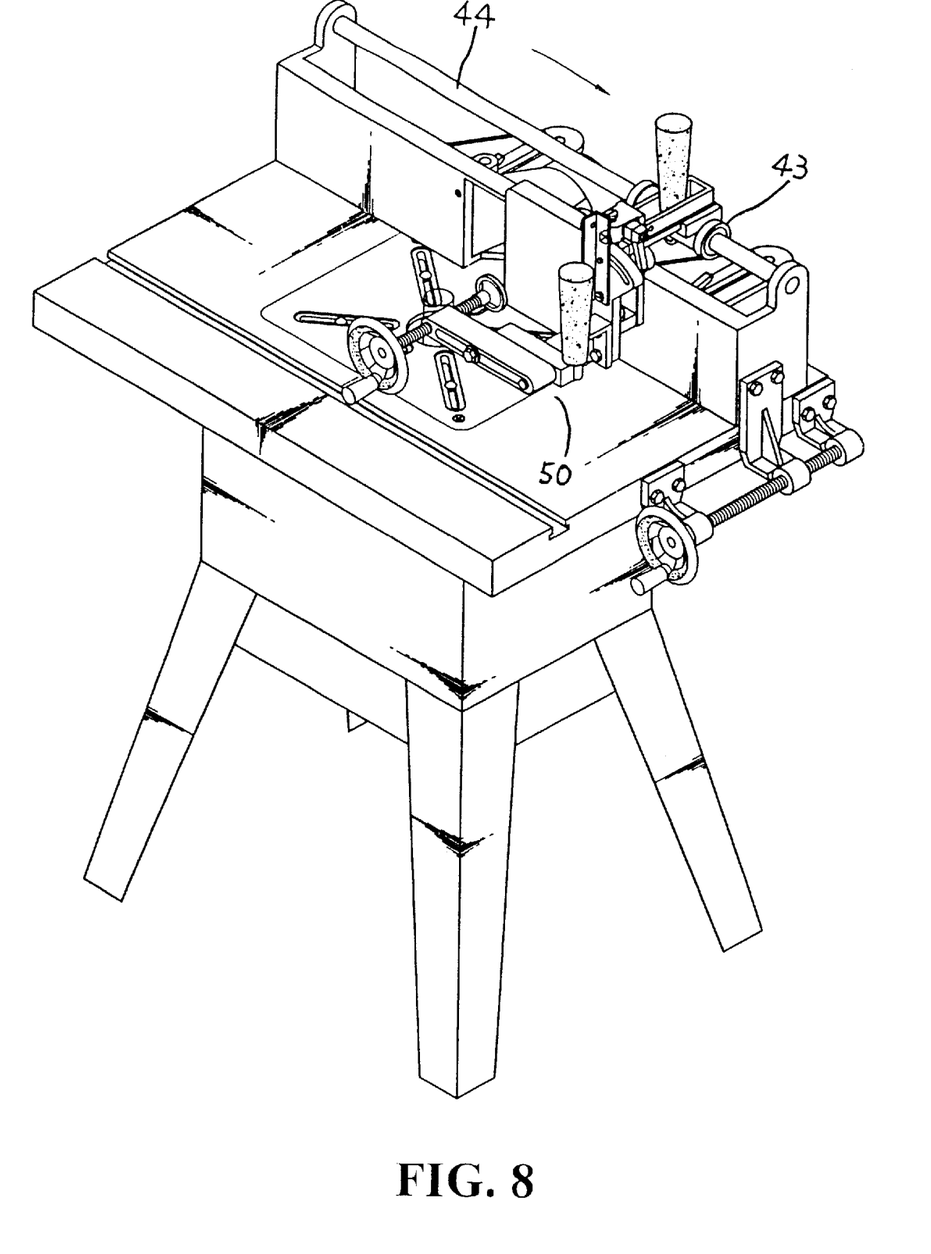

Referring to FIG. 7, the platform 31 is mounted on a base 60 so that the cutter 61 extends upwardly through the center hole 311 of the core plate 33. As shown in FIG. 8, the clamping device 50 is changed in position by moving the sleeve 43 along the axle 44.

Figure 9:
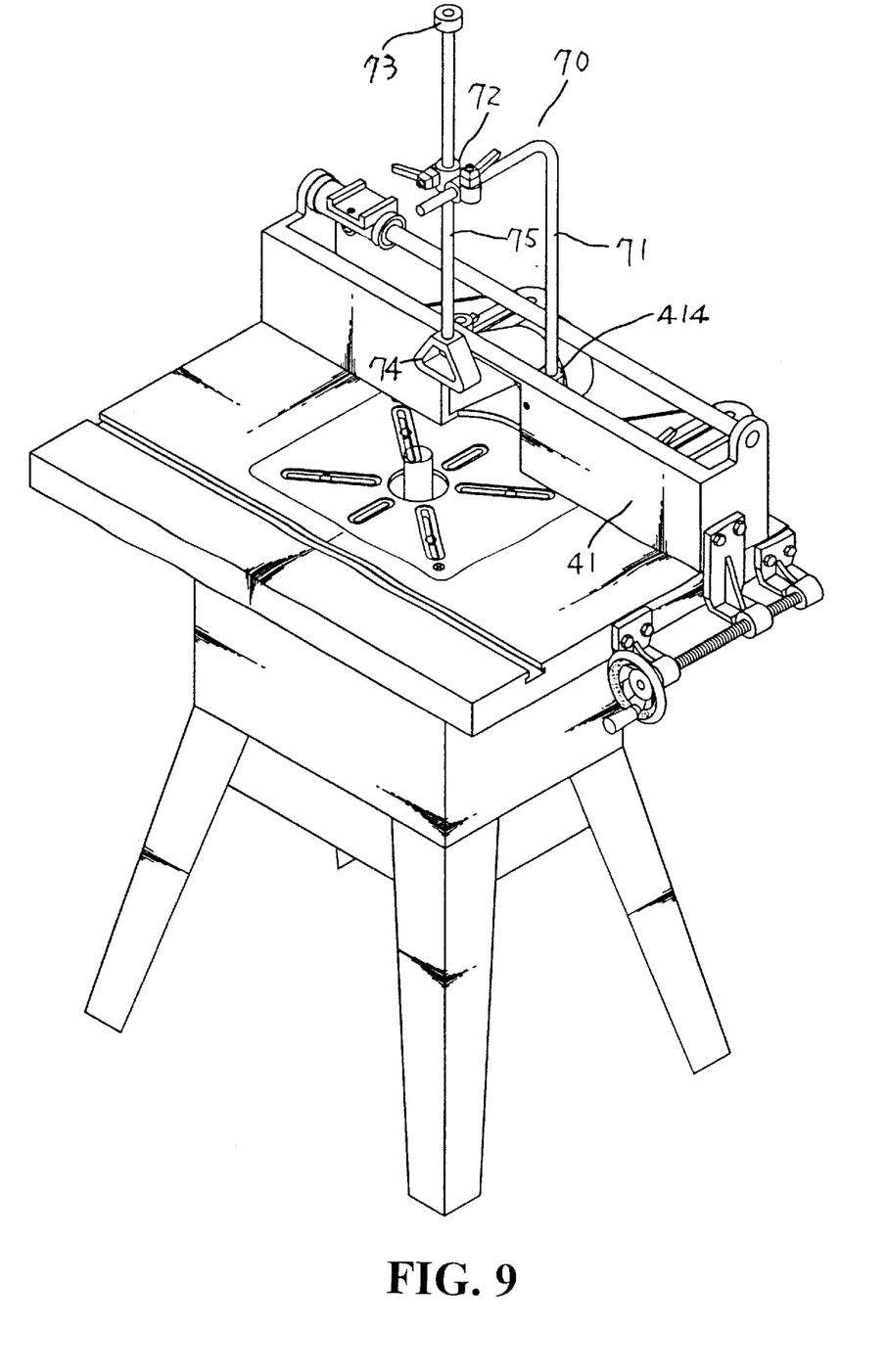
FIG. 9 is a first working view of the present invention.
Figure 10:
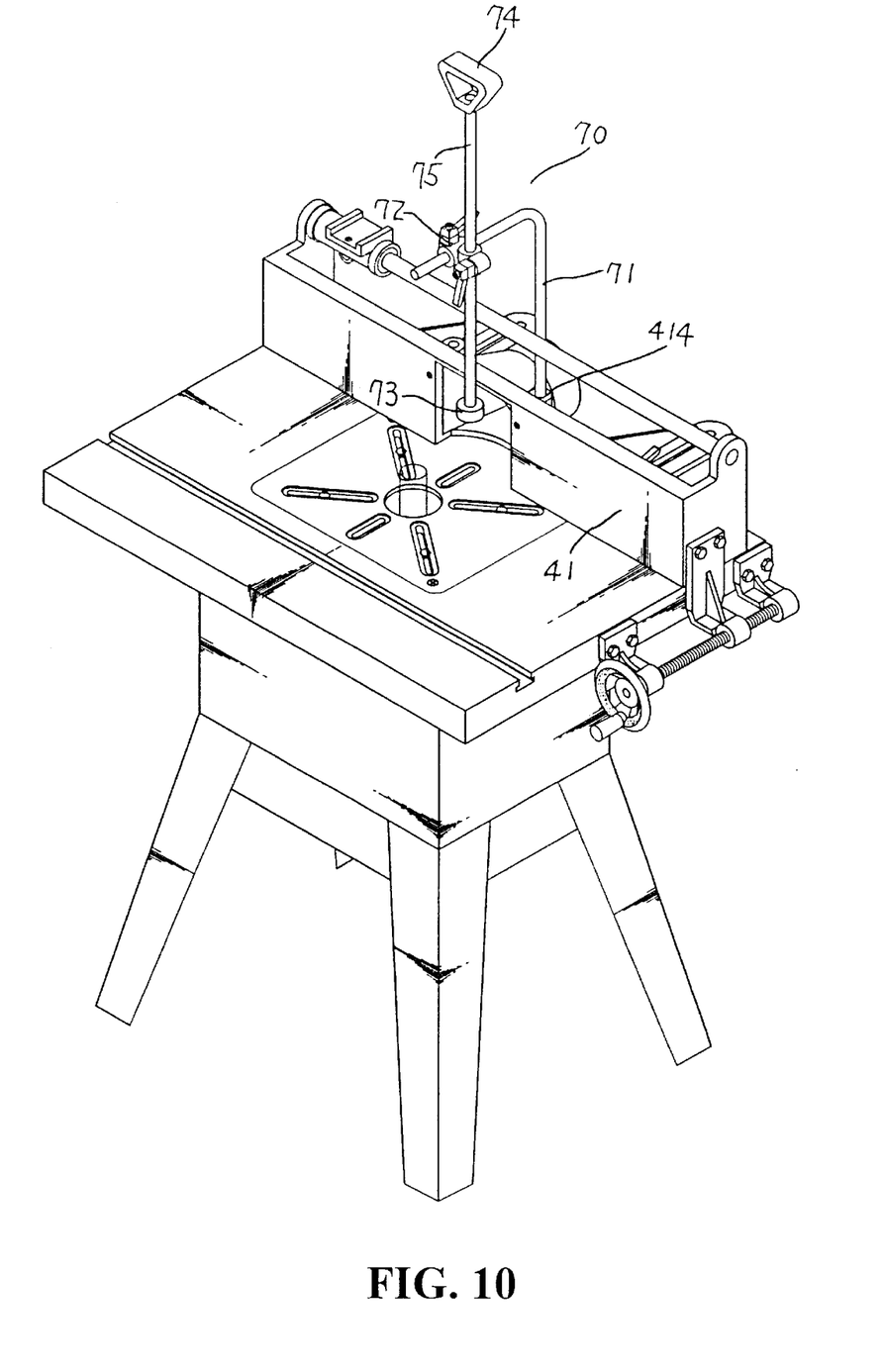
FIG. 10 is a second working view of the present invention.

Turning now to FIGS. 9 and 10, a holder 70 is mounted on the hole 413 of the positioning device 41, which comprises an L-shaped rod 71, a cross-shaped sleeve 72 and a rod 75 provided at one end with a roller 73 and the other end with a generally triangular member 74 so that the rod 75 can be moved up and down or rotated with respect to the sleeve 72 for holding a workpiece in place.

Accordingly, the present invention can be operated as follows:

1. The positioning device 41 can be adjusted in position by loosening the adjust bolts 46 at the rear side of the positioning device 41 and tuning the adjust screw rod 35.
2. The workpiece can be processed by holding the two handles 57 and 58 and moving the sleeve 43 along the axle 44 so as to move the clamping device 50.
3. The position of the workpiece on the positioning plate 52 can be adjusted by loosening the bolts 512 and rotating the positioning plate 52 with respect to the supporting arm 51.
4. The angular baffle 53 can be adjusted by loosening the bolts 522 and 523 thereby enabling the angular baffle 53 to be rotated to adjust the angular position of the workpiece.
5. The workpiece can be secured to the positioning plate 52 by turning the adjust screw rod 56.
6. The clamping device 50 can be dismantled from the positioning device 41 and replaced with a holder 70.

It should be noted, however, that the base 60 for supporting the platform 31 and the control circuit for the wood carving machine are well known in the art and not considered parts of the invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A worktable for a wood carving machine comprising a platform provided with two stationary brackets and an adjust screw rod threadedly engaged with said brackets, a positioning device provided with a movable bracket threadedly engaged with said adjust screw rod for enabling said positioning device to be moved to adjust position of a workpiece to be processed, said positioning device having a sleeve on which is mounted a clamping device for holding said workpiece and comprising a supporting arm, said supporting arm having a side from which extends a seat having an upper and a lower lugs between which is arranged a positioning plate by bolts, an adjust screw extending through said upper lug to keep said positioning plate in place, said supporting arm having another side provided with an eccentric roller below said seat, said positioning plate having a lug fitted between said upper and lower lugs of said supporting arm by bolts thus enabling said positioning plate to be rotated, wherein said sleeve of said positioning device is formed with a U-shaped recess on which is mounted said supporting arm by a handle, and said supporting arm of said clamping device has a roller slidably mounted on an upper edge of said positioning device.

* * * * *